(12) United States Patent
Kozlov et al.

(10) Patent No.: US 7,769,244 B2
(45) Date of Patent: Aug. 3, 2010

(54) AUTOMATIC DIGITAL FILM AND VIDEO RESTORATION

(75) Inventors: Inna Kozlov, Bogart, GA (US); Valery Zheludev, Tel-Aviv (IL); Alexander Petukhov, Bogart, GA (US)

(73) Assignee: Algosoft-Tech USA, LLC., Bogart, GA (US)

( * ) Notice: Subject to any disclaimer, the term of this patent is extended or adjusted under 35 U.S.C. 154(b) by 0 days.

(21) Appl. No.: 12/074,390

(22) Filed: Mar. 4, 2008

(65) Prior Publication Data

US 2008/0170801 A1 Jul. 17, 2008

Related U.S. Application Data

(63) Continuation of application No. PCT/IL2006/001011, filed on Aug. 31, 2006.

(30) Foreign Application Priority Data

Sep. 5, 2005 (IL) .................................. 170683

(51) Int. Cl.
*G06K 9/48* (2006.01)
*G06K 9/42* (2006.01)
*G06K 9/44* (2006.01)
*G06K 9/40* (2006.01)

(52) U.S. Cl. ................. 382/275; 382/199; 382/257; 382/262; 382/263; 382/264; 382/266

(58) Field of Classification Search ............... 382/107, 382/164, 257, 262, 263, 266, 275, 199
See application file for complete search history.

(56) References Cited

U.S. PATENT DOCUMENTS

| | | | |
|---|---|---|---|
| 5,023,919 A * | 6/1991 | Wataya | 382/263 |
| 5,266,805 A | 11/1993 | Edgar | |
| 5,355,421 A | 10/1994 | Koyama | |
| 5,365,429 A * | 11/1994 | Carman | 378/37 |
| 5,473,384 A | 12/1995 | Jayant et al. | |
| 5,581,667 A * | 12/1996 | Bloomberg | 358/1.9 |
| 5,757,977 A * | 5/1998 | Mancuso et al. | 382/260 |
| 5,771,318 A * | 6/1998 | Fang et al. | 382/261 |
| 5,848,181 A * | 12/1998 | Ogata | 382/169 |
| 5,850,471 A | 12/1998 | Brett | |
| 5,920,356 A * | 7/1999 | Gupta et al. | 348/606 |
| 6,035,072 A | 3/2000 | Read | |
| 6,041,145 A * | 3/2000 | Hayashi et al. | 382/268 |
| 6,055,340 A * | 4/2000 | Nagao | 382/261 |
| 6,094,511 A * | 7/2000 | Metcalfe et al. | 382/260 |
| 6,160,923 A | 12/2000 | Lawton et al. | |
| 6,219,462 B1 | 4/2001 | Anandan et al. | |
| 6,233,364 B1 | 5/2001 | Krainiouk et al. | |
| 6,259,823 B1 * | 7/2001 | Lee et al. | 382/268 |
| 6,266,054 B1 | 7/2001 | Lawton et al. | |

(Continued)

OTHER PUBLICATIONS

International Search Report mailed Jul. 7, 2008 in corresponding International Application PCT/IL06/01011.

*Primary Examiner*—Matthew C Bella
*Assistant Examiner*—Anthony Mackowey
(74) *Attorney, Agent, or Firm*—Frishauf, Holtz, Goodman & Chick, P.C.; Robert P. Michal

(57) ABSTRACT

A method, system, and computer program for automatic restoration of digital film and video frames, by operation of a sequence of five main interactive computer program blocks, mainly separating moving objects from still objects, separating smooth texture from regions containing edges using the coherency map, and detecting and removing defects to provide restored frames using a pair of frames as reference frames for each processed frame.

20 Claims, 10 Drawing Sheets
(4 of 10 Drawing Sheet(s) Filed in Color)

U.S. PATENT DOCUMENTS

| | | |
|---|---|---|
| 6,307,979 B1 | 10/2001 | Kondo et al. |
| 6,330,372 B1 * | 12/2001 | Goldstein et al. ............ 382/266 |
| 6,339,479 B1 * | 1/2002 | Kishimoto ................. 358/1.2 |
| 6,373,992 B1 * | 4/2002 | Nagao ......................... 382/266 |
| 6,438,270 B1 * | 8/2002 | Harrington ................. 382/262 |
| 6,628,842 B1 * | 9/2003 | Nagao ......................... 382/266 |
| 6,665,448 B1 * | 12/2003 | Maurer ....................... 382/261 |
| 6,667,815 B1 * | 12/2003 | Nagao ......................... 358/1.9 |
| 6,668,097 B1 * | 12/2003 | Hu et al. ..................... 382/275 |
| 6,728,005 B1 | 4/2004 | Jia et al. |
| 6,731,775 B1 | 5/2004 | Ancin |
| 6,771,793 B1 * | 8/2004 | Yamada ...................... 382/264 |
| 6,847,738 B1 * | 1/2005 | Scognamiglio et al. ...... 382/260 |
| 6,879,733 B2 * | 4/2005 | Shu et al. .................... 382/275 |
| 6,879,734 B2 * | 4/2005 | Chen et al. .................. 382/275 |
| 6,931,160 B2 | 8/2005 | Gindele et al. |
| 6,978,050 B2 * | 12/2005 | Hunter et al. ............... 382/275 |
| 7,020,346 B2 | 3/2006 | Dupont et al. |
| 7,079,703 B2 * | 7/2006 | Kriss .......................... 382/275 |
| 7,130,469 B2 * | 10/2006 | Adachi ....................... 382/224 |
| 7,130,483 B2 * | 10/2006 | Kim ........................... 382/266 |
| 7,355,757 B2 * | 4/2008 | Bhattacharjya ............. 358/3.27 |
| 7,373,013 B2 * | 5/2008 | Anderson ................... 382/261 |
| 7,412,109 B2 * | 8/2008 | Kong et al. ................. 382/261 |
| 7,430,336 B2 * | 9/2008 | Raveendran ................ 382/268 |
| 7,551,792 B2 * | 6/2009 | Kong et al. ................. 382/260 |
| 7,570,832 B2 * | 8/2009 | Chui et al. .................. 382/260 |
| 2002/0034337 A1 * | 3/2002 | Shekter ...................... 382/275 |
| 2002/0176113 A1 * | 11/2002 | Edgar ........................ 358/3.27 |
| 2003/0039402 A1 * | 2/2003 | Robins et al. ............... 382/275 |
| 2003/0081854 A1 * | 5/2003 | Deshpande ................. 382/261 |
| 2003/0202713 A1 | 10/2003 | Sowa |
| 2004/0001705 A1 | 1/2004 | Soupliotis et al. |
| 2004/0071360 A1 | 4/2004 | Maurer |
| 2005/0047672 A1 | 3/2005 | Ben-Ezra et al. |
| 2005/0100235 A1 * | 5/2005 | Kong et al. ................. 382/261 |
| 2005/0100236 A1 | 5/2005 | Kong et al. |
| 2006/0001597 A1 * | 1/2006 | Han ............................ 345/32 |
| 2008/0019605 A1 * | 1/2008 | Yea et al. .................... 382/261 |

* cited by examiner

AUTOMATIC DIGITAL FILM AND VIDEO RESTORATION

This application is a Continuation of PCT/IL2006/001011 filed Aug. 31, 2006, the priority date of which is claimed herein, and the entire disclosure of which is incorporated herein by reference.

TECHNICAL FIELD

The present invention relates to digital image processing in general, and in particular to a method, a system, and a software computer program for the detection, classification, identification, and restoration of defects and artifacts in images or frames, such as digital still photography, digital movie frames, and video recording frames. More particularly, the present invention relates to a method, system and computer program for the automatic restoration of digital film frames and video frames that may automatically detect, classify, and identify defects and artifacts for frame restoration.

BACKGROUND ART

Many attempts have been made to provide means for restoring deteriorated digitized frames, and an example of some of those attempts are disclosed in the following prior art patents.

U.S. Pat. No. 5,266,805 by Edgar, recites a system and method for image recovery to compensate for effects of a recording medium such as film on image data retrieved therefrom.

U.S. Pat. No. 5,355,421 to Koyama recites a method for identifying and removing noise from digitized images includes the steps for judging whether or not a group of black pixels represents a noise by analyzing the number of pixels in the group, the degree of flattening of the group and the curvature of the region.

U.S. Pat. No. 5,850,471 to Brett recites a high-definition digital video processing system for correcting video color and other attributes, such as pixel location and sharpness.

U.S. Pat. No. 6,035,072 to Read, recites the mapping defects of such as dirt, dust, scratches, blemishes, pits, or defective elements or pixels in a CCD, scanner, photocopier, or image acquiring device, dynamically detected by processing a plurality of images via a computer.

U.S. Pat. No. 6,160,923 to Lawton, et al. recites a user directed dust and compact anomaly remover from digital images which is a technique of editing a digital image for the automatic removal of blotchy areas.

U.S. Pat. No. 6,233,364 to Krainiouk, et al. is for a method and system for detecting and tagging dust and scratches in a digital image, which is a system for identifying and tagging anomalies, such as images of dust and scratches in a digital image so that they can be removed from the image.

U.S. Pat. No. 6,266,054 to Lawton, et al. recites the automated removal of narrow, elongated distortions from a digital image, by using an apparatus including a method of digital image processing which allows a user to remove narrow, elongated areas of image distortion from a digitized image.

U.S. Pat. No. 6,728,005 to Jia, et al. recites a method for the automatic removal of image artifacts that includes the steps of comparing scanned image data pertaining to regions where it is possible for image artifacts to be present to idealized image artifact data, determining whether image artifacts or partial image artifacts are present in the known regions, excluding such regions or portions of them as appropriate from a scannable area, and generating an image from the elements of the scanned image data pertaining only to the portions of the scannable area for which no image artifacts are determined to be present.

U.S. Pat. No. 6,931,160 to Gindele, et al. recites a method of spatially filtering digital image that includes receiving a source digital image including pixels corresponding to one or more different colors; selecting a pixel of interest in the source digital image; calculating two or more noise free pixel estimates for the pixel of interest using pixel values sampled in a local region about the pixel of interest; selecting a final noise free pixel estimate for the pixel of interest from the noise free pixel estimates; and repeating for other pixels in the source digital image to provide a spatially filtered digital image.

U.S. Pat. No. 7,020,346 to Dupont, et al., recites a method for the removal of scratches from digital images that provides for a method which restores a digitized image or a series of digitized images automatically, by eliminating straight or virtually straight scratches in the images.

Finally, U.S. Pat. No. 6,307,979 to Kondo, et al. is for a classified adaptive error recovery method and apparatus and article of manufacture for restoring a deteriorated signal to an undeteriorated signal. A deteriorated signal consists of a plurality of deteriorated and undeteriorated data points. For each deteriorated data point, a plurality of class types is created based upon characteristics of the area containing the deteriorated data point.

However, none of the citations hereinabove is capable of automatically restoring still frames, digital film frames, and video frames without adding new artifacts.

DISCLOSURE OF INVENTION

It is a well known problem that frames of movie films taken by a film camera, and/or by a video camera, and/or movies' recordings, either digital or analog, taken by a video camera recorder (VCR), deteriorate with time and present defects and artifacts having an unpleasant and annoying effect on viewers.

The solution to this problem is provided by the use of a computer program, which first receives the digitized sequence of frames and input parameters and then runs an automatic process for digital film and video restoration. The sequence of frames is either a single frame or a succession of frames. It is understood that the succession of frames has f frames, with f being a positive integer running from 1 to n.

Features of the computer program for automatic restoration of defects include the decomposition of each frame in blue, red and green elements and the use of a pair of adjacent frames as reference frames.

It is an object of the present invention to provide a method, system, and a software computer program applicable to digital film and video movies for the automatic restoration of defects on at least one frame of a succession of f digital frames where f is a positive integer greater than zero, the method being operated by entering the succession of frames as input into a computer, and operating a software computer program to produce an output, as characterized by the steps of:

loading parameters in a procedure lunlo2, preprocessing and processing the succession of frames in sequence by operation of a procedure lproc2, operating a frame-by-frame processing procedure lmain_proc2, coarsely separating moving objects from static objects and still background in a frame by operation of a program block named ichofrag10, finely separating moving objects for differentiation from still background objects and for detection of areas with a smooth texture by execution of a routine lser6, and saving corrected and restored frames in a routine lchu6, whereby an output free of defects is obtained.

It is another object of the present invention to provide for at least one color component being selected from the group consisting of red, green, and blue, and being loaded as input from the succession of frames to obtain a restored output. Then, a coherency map is calculated for each frame of the succession of frames, the areas of each frame having a smooth texture are separated from regions containing edges, defects appearing on a frame are removed by application of median filtering, each frame is corrected for removal of smoothed edges, and each frame is reconstructed from the at least one restored color component and remaining color components out of the group of three components, whereby all defects are removed and a succession of f frames free of defects is obtained.

It is also an object of the present invention to apply multi-resolution analysis for camera motion compensation by means of a function lglobshif25.

It is yet an object of the present invention to operate a coarse separation block and a fine separation block erated on the input, and inside each frame:

the coarse separation block carries out preliminary separation of moving Hobjects from a still background objects, by use of the formula $qq=|(Rv1(:,:,1)+Rv3(:,:,1))*Rv2(:,:,1)|^2$, in association with two-dimensional arrays Rv1, Rv2, Rv3, to denote displacements between frames of interest, and the fine separation block performs refined separation of moving objects from still background objects and finds fragments of smooth texture inside moving objects that can be treated similarly to the still background objects by operating a technique executed by means of a wandering testing circle and subsequent morphological operations, and checking in association with the inequality $Mcd < up \cdot ma$, whether an area covered by the testing circle is referred to the background or to smooth texture and is subject to optional correction and restoration.

It is yet another object of the present invention to operate a defects detection and recovery block to prepare a function to be used for the detection of defects inside smooth textures and background areas by calculating an absolute differences between three frames, namely:

$Q12=|A(:,:,1)-A(:,:,2)|$, $Q32=|A(:,:,2)-A(:,:,3)|$, $Q13=|A(:,:,3)-A(:,:,1)|$, and defining a frame QQ123 as $QQ123=|(Q32+Q12)-Q13| \cdot fb$, calculating a parameter $mu13=\min(Q12,Q32)/(\max(Q12,Q32)+\epsilon)$ to detect defects inside smooth texture and background area of the frame of interest and for and restoring ecting defects using values of reference frames, and constructing a future threshold function tre1 as:

$tre1=tre \cdot me$.

It is an additional object of the present invention to calculate a coherency map of a frame by carrying out median filtering only within smooth texture areas and applying a correction and restoration procedure to avoid smoothing edges, where the coherency map is calculated for at least one color component by finding coefficients of coherency along four directions and calculating coefficients of coherency for each one of the four directions:

$$P(M_0, \theta_j) = \frac{\left(\sum_{k=-luli}^{luli} F_{j,k}\right)^2}{(2luli+1)\sum_{k=-luli}^{luli} F_{j,k}^2},$$

$j=0,1,2,3$.

It is still an object of the present invention to collect results in two maps having a size equal to the size of a frame:

$$MAn(M(x,y)) = \begin{cases} 0, & \text{if } M(x,j) \in \tilde{\mu}; \\ \theta_{\max}(M)+1, & \text{if } M(x,y) \in \mu, \end{cases}$$

$$MAb(M)(x,y) = \begin{cases} 0, & \text{if } M(x,y) \in \tilde{\mu}; \\ p_{\max}(M)+1, & \text{if } M(x,y) \in \mu. \end{cases}$$

It is yet an additional object of the present invention to separate smooth texture areas are separated from regions containing edges by use of a set of morphological operations:

se=strel('line',10,0);

x=imopen(MAn,se);

x=bwareaopen(x,550);

to remove small non-zero patches and apply a procedure se=strel('line',15,90);

x=imclose(x,se);

to fill gaps in remaining non-zero regions.

It is a further object of the present invention to perform median filtering to remove defects from a frame by use of a MATLAB function medfilt1.

It is moreover an object of the present invention to provide restore edges by a set of morphological operations:

mam=max(aq(:));

qa=(aq>mam/10);

qaq=bwareaopen(qa,Q);

a map qaq of remaining blocks is displayed and original values are restored to pixels of Red, Green, and Blue components located in non-zero regions of the map qaq, and frames are is reconstructed from restored Red, Green, and Blue pixels, whereby all defects are removed.

It is one more object of the present invention to use the coherency map to separate smooth texture from regions containing edges.

It is moreover another object of the present invention to provide correction and restoration of smoothed edges pertaining to connected blocks corresponding to the smoothed edges that are singled out from a difference map, by use of the coherency map. Moreover, the coherency map is used for camera motion compensation, and median filtering is performed for removing defects from high definition frames.

It is yet a further object of the present invention to process a frame for correction and restoration in association with a pair of adjacent frames serving as reference frames.

It is a further an additional object of the present invention to process a frame out of a sequence of frames for correction and restoration in association with a pair of adjacent frames serving as reference frames, wherein:

a frame which is first in the sequence uses a pair of adjacent following frames, a frame which is last in the sequence uses a pair of adjacent preceding frames, and another than the first or the last frame uses one adjacent preceding reference frame and one adjacent following frame.

It is still further an additional object of the present invention to provide a computer readable medium storing instructions that, when executed by a computer cause the computer to perform each of the method steps described hereinabove for the restoration of digital frames and video movies.

Finally, it is yet an additional object of the present invention to provide a computer program applicable to digital film and video movies for automatically restoring defects on at least one frame of a succession of f frames, where f is a positive integer greater than zero, comprising:

a computer-readable medium encoded with instructions set forth in the computer program, which is executed by a computer having a memory, at least one color component selected from the group consisting of red, green, and blue being derived from the at least one frame and being loaded into the computer, a coherency map being derived for the at least one frame for executing calculation on the at least one derived color, areas of the at least one frame having a smooth texture and regions of the at least one frame containing edges being separated from each other, median filtering being applied to the at least one frame for removing defects therefrom, smoothed edges being corrected and restored, and the at least one frame being reconstructed from the at least one corrected color component and remaining color components of the group of three components, whereby all defects are removed and an at least one frame free of defects is obtained.

BRIEF DESCRIPTION OF DRAWINGS

The patent or application file contains at least one drawing executed in color. Copies of this patent with color drawing(s) will be provided by the Patent and Trademark Office upon request and payment of the necessary fee.

In order to understand the invention and to see how it may be carried out in practice, a preferred embodiment will now be described, by way of non-limiting example only, with reference to the accompanying drawings, in which.

BEST MODE FOR CARRYING OUT THE INVENTION

It is an object of the present invention to provide a method, system, and a software computer program applicable to digital still pictures, digital movie frames, and analog/digital video camera recording frames, for the automatic restoration of damaged frames by returning them to their original unblemished condition. More particularly, reference is made to successions of consecutive frames.

It is understood that the software computer program(s) described hereinbelow in relation to the product and the process refer all to an automatic product and to automated processing.

Damaged frames, such as video frames for example, are restored by automatic digital film and video restoration, or Computer Programs for Automatic Restoration of frames, hereinafter CPAR, which is built as blocks of computer programs operating generally sequentially and in interaction with smaller computer program sections.

A sequence of five main computer software program blocks represents the five major logical portions of the automatic for digital film and video restoration.

The first portion accepts the definitions for setting CPAR features in a procedure indicated as lunlo2, by capturing parameters being loaded as input.

The second portion deals with pre-processing and processing. The procedure called lproc2 launches the processing of frames in sequence, and calls for the operation of the frame-by-frame processing procedure Imain_proc2.

The third portion usually handles coarse separation, for the separation of moving objects from the static, or still objects in the frame. This is achieved by operation of a block named ichofrag10.

The fourth portion runs fine separation. Sometimes the CPAR jumps directly from the second portion to the fourth portion, which carries out a refined separation of moving objects, to differentiate them from the still background and to detect areas having a smooth texture. This aim is achieved by the execution of a routine marked as lser6.

The fifth portion is a block for the detection and removal of defects, and wherein the corrected images, or restored frames are saved. Calling a routine lchu6 performs this last portion. The words image and frame may be used interchangeably hereinbelow. Furthermore, the word restoration is meant to also include correction.

Figure 1A:
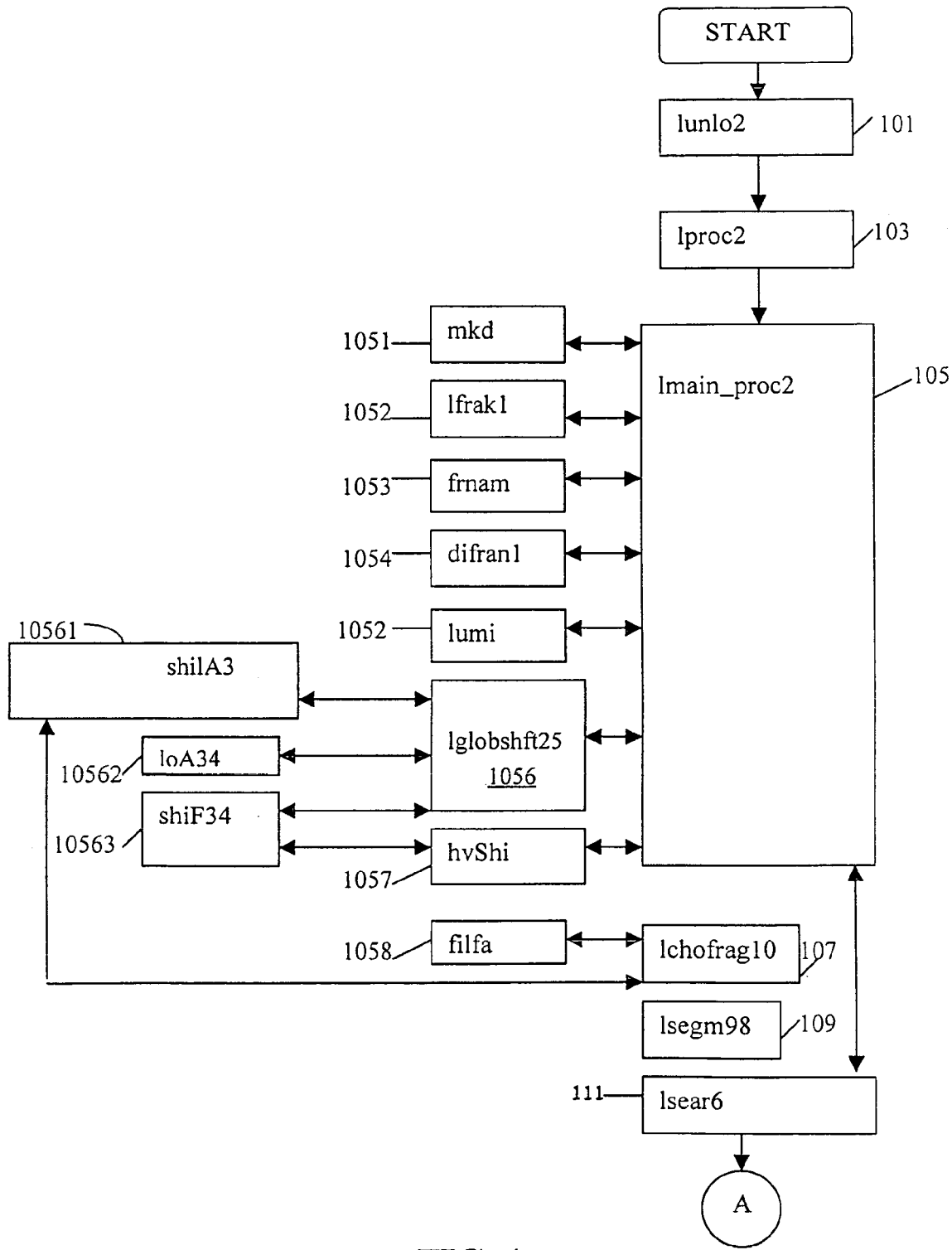
FIGS. 1a and 1b show a block diagram showing the structure of the automatic digital film and video restoration, or CPAR, or computer program Lunb_1_4.
Figure 1B:
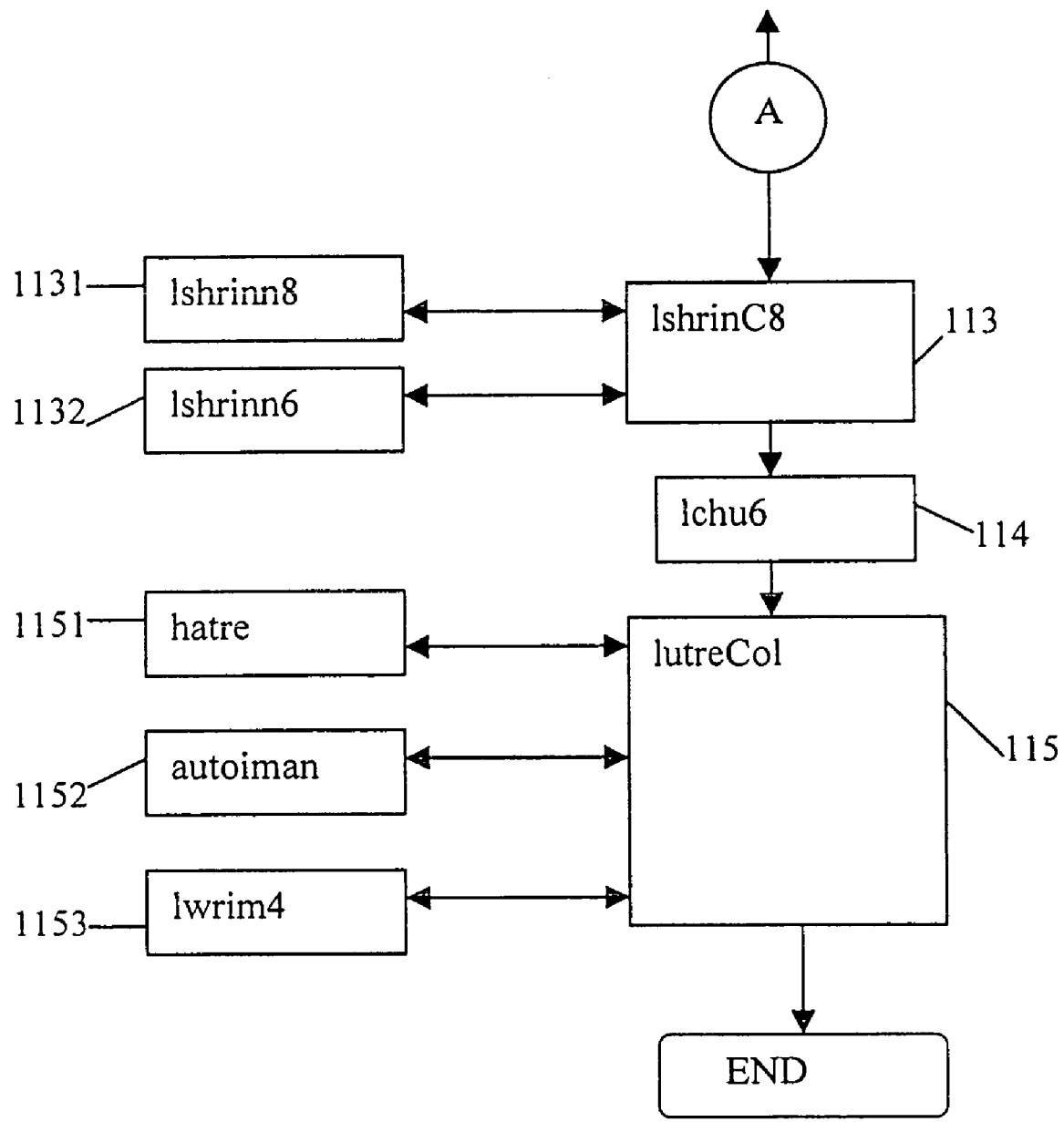

FIG. 1, shown on two sheets as FIG. 1a and FIG. 1b, is a general diagram showing the structure of the CPAR, or automatic digital film and video restoration, also named computer program Lunb_1_4.

The first portion, or definition blocks, includes the procedures lunlo2 and lproc2, shown, respectively, as 101 and 103 in FIG. 1. The definitions block start with the main program lunlo2, which sets both the mode of processing of the frames to be processed, and the parameters of processing. These parameters for processing in either a single or double processing mode are listed hereinbelow. It is noted that the operator may take a brief preview of the succession of frames before setting the parameters, but that the operation of the CPAR process is entirely automatic.

prid—single or double processing.

pprid—optional display of various transition or intermediate stages of the processed image.

ssd—optional saving of the final stage of the processed frame.

plumid—modes of processing; in addition to processed frame, two reference frames are taken. Plumid may accept the following values:
    0—'Down': two preceding frames are taken from the directory Store (never processed before). The result is entered in the directory Impro0.
    1—'UPafterDOWN': two subsequent frames are taken from the directory Impro0 (Impro* contains already processed frames). The result is entered in the directory Impro1.
    2—'DOWNafterUP': two preceding frames are taken from the directory Impro3. The result is entered in the directory Impro2.
    3—'UP': two subsequent frames are taken from the directory Store. The result is entered in the directory Impro3.
    4—'CENTER': a preceding and a subsequent frame are taken from the directory Store. The result is entered in the directory Impro4.
    5—'DOWNafterCENTER': two preceding frames are taken from the directory Impro4. The result is entered in the directory Impro5.
    6—'UPafterCENTER': two subsequent frames are taken from the directory Impro4. The result is entered in the directory Impro6.
    7—'DOWNaftStrip': two preceding frames are taken from the directory Verst (The directory Verst contains frames processed by the program removing line defects). The result is entered in the directory Impro10.
    8—'UPaftStrip': two subsequent frames are taken from directory Verst. The result is entered in the directory Impro13.
    9—'CENTERaftStrip': a preceding and a subsequent frame are taken from the directory Verst.

trfod—type or kind of motion compensation; may accept the following values:
    0—none.
    1—corr: correlations of lines in horizontal and vertical directions. Advisable if there are distinct horizontal and vertical edges.
    2—stand: the frame is split into small rectangles and optimal motion for each rectangle is found, first in the vertical direction, afterwards in the horizontal direction. Then the histogram of displacements in each direction and for each rectangle is constructed and global motion is defined separately in each direction according to the most populated lot of the histogram. Advisable, according to the operator's decision, when the moving objects occupy a minor part of the frame and a distinct background is present.
    3—second term: the second most populated lot of the histogram is used. Sometimes helps when the moving objects occupy a major part of the frame.
    4—multi-resolution analysis: the frame is reduced half a dimension three times and then for every level of decomposition of multi-resolution analysis, the frame is split into small rectangles and optimal spatial motion is found for each rectangle. Then the three-dimensional histogram of displacements is constructed for all levels of decomposition and global motion is defined separately in each direction according to the most populated lot of the histogram. The three-dimensional histogram of displacements includes levels of decomposition, and both a horizontal and a vertical direction for each rectangle. The operator may set the levels of decomposition, for example level 7 for high definition, level 6 for low definition and so on, according to the succession of frames. Furthermore, the global motion is considered as the maximal motion in the area of the frame, as for example background motion or camera movement.

The parameters listed hereinbelow are selected by the operator.

upd—threshold for domain: an important tuning parameter; is used in lshrinC8 for separation of still background (together with smooth texture) and moving objects. Increase of upd leads to widening of the background area and vice versa. The comparison between adjacent frames is implemented during processing only within the background area.

rhod—radius wandering circle (even number); is used in lshrinC8, indicated as 113 in FIG. 1, for separation of still background (together with smooth texture) and moving objects; a typical range for the value of rhod is 4-8. The increase of the value of rhod adds robustness versus flexibility and vice versa.

sprv, sprh—partition of the image; is used in lglobshif25, indicated as 1056 in FIG. 1, and Reg.

leffd—length of median filter; a filter of length leffd is applied before the preprocessing phase ichofrag10, indicated as 107 in FIG. 1, and in the final separation procedure lshrinC8, shown as 113 in FIG. 1; typical range is 4-10.

prepd—pre-processing or not: launch of the pre-processing block ichofrag10, marked as 107 in FIG. 1, which implements rough separation of still background and moving objects; generally advisable but may be dropped sometimes and replaced by a jump to lsear6, shown as 111 in FIG. 1. The decision to pre-process is taken by the operator according to type of scene. Pre-processing is always operated in case of a whole movie.

vecod—width of vertical restoration and correction; the vertical restoration removes vertical lines having a length of less than vecod; in the "moving" fragments helps to convert peninsulas into islands; employed in lshrinC8, marked as 113 in FIG. 1. The length of vecod is set by help the procedure strel in the morphological operations of MATLAB. Usually strel=12.

hocod—width of horizontal restoration and correction; the horizontal restoration removes horizontal lines having a length of less than hocod; in the "moving" fragments helps to convert peninsulas into islands; employed in lshrinC8, designated as 113 in FIG. 1.

tred—threshold for restoration; the threshold for final comparison of still background portions together with smooth texture of adjacent frames; employed in lutreCol, shown as 115 in FIG. 1; a typical range is 1-3.

subj—current video series.

Once the parameters listed hereinabove are set, the procedure lproc2, marked as 103 in FIG. 1, is called, which launches the processing of the sequence of consecutive frames, one after another. The computer program CPAR starts the preprocessing block by operating the procedure lmain_proc2, marked as 105 in FIG. 1, which governs the processing of a single frame. Furthermore, lmain_proc2, marked as 105, uses successively the subroutines mkd, lfrak1, frnam, difran1, and lumi.

Figure 2:
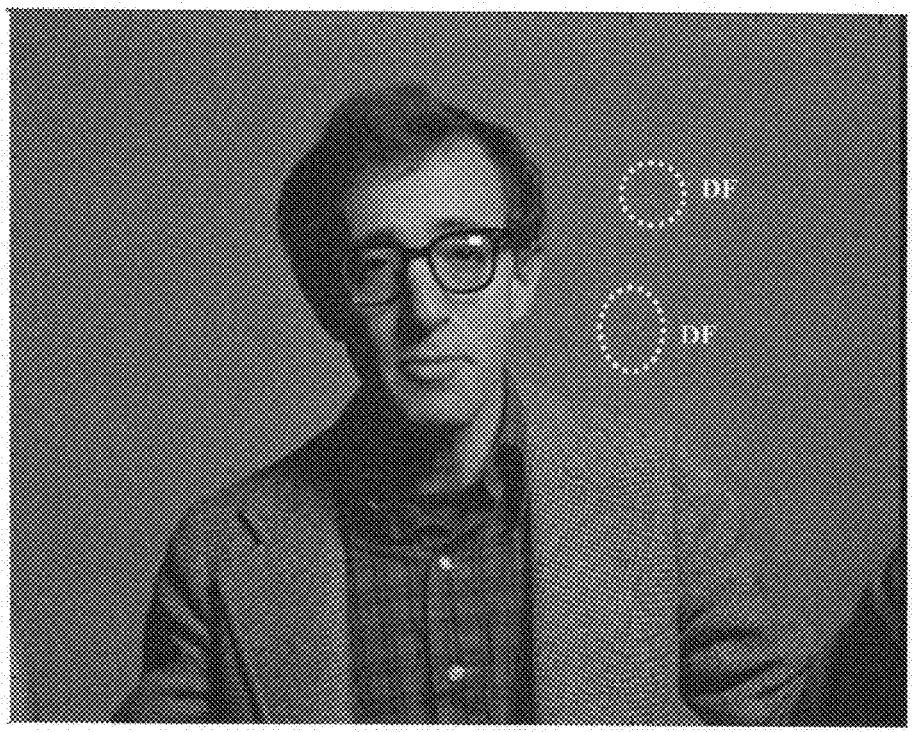
FIG. 2 presents an example of a frame in processing.

After setting the parameters listed hereinabove, the procedure lproc2 is called, which launches the processing of frames one after another, and the computer software program CPAR starts the pre-processing block with procedure lmain_proc2. This routine governs the processing of a single frame, such as shown for example in FIG. 2. The two small defects are surrounded and marked as DF.

First of all, the procedure mkd marked as 1051 in FIG. 1 is called to create a plurality of directories, directly related to the quantity of modes of processing, for storing results of the different modes of processing. Then, the function ifrak1 marked as 1052 presets pairs of reference frames, for the frame to be processed according to the mode of processing, for example, two adjacent surrounding frames, two preceding frames, or two subsequent, or following frames.

In a succession of f frames, where f is a positive integer greater than zero, or f=1, 2, ... n, two subsequent frames are used as reference frames. When the processed frame is the first frame in the succession, f=1, then the two adjacent following frames are used as reference frames. When the processed frame is the last frame in the succession, f=n, then the two adjacent preceding frames are used as reference frames. Usually, when f is not equal to 1 or to n, an immediately adjacent preceding and an immediately adjacent following frame becomes the reference frame.

A series of three numbers for the respective above-identified frames is entered in the vector fr. According to these three numbers, the function frnam marked as 1053 defines the names of three files fr_name from which a frame of interest is processed and two reference frames are to be read from or written to. The function difran1 marked as 1054 reads these frames from the fr_name and its output comprises the Red, Green, and Blue components Br, Bg, Bb of the frames and the grayscale intensity frames A, which will be used for the detection of defects in the frame of interest. The three-dimensional arrays A, Br, Bg, Bb are of size M×N×3. Eventually, the function lumi marked as 1055, adjusts the luminance of the grayscale of the previous reference frame A(:,:,1) and of the grayscale of the subsequent reference frame A(:,:,3) to the luminance of the grayscale of the frame of interest A(:,:,2).

Dependent on the value of the parameter trfod, the program may perform the optional camera compensation (in case of camera motion) by means of the function lglobshif25 1056, in case trfod=1,~3,~4, or by means of the function Reg in case trfod=5. These routines define the camera compensation for two reference frames with respect to the frame of interest (for the grayscale frames). In case trfod=1, the frame of interest and two reference frames are thresholded by their mean value (i.e. every pixel of each frame is assigned to be zero if its greylevel is less then frame's mean value), vertical and horizontal line correlation is performed and two reference frames are being shifted accordingly. Otherwise, in case trfod=3 or trfod=4, then by means of the procedure shilA3 10561, two reference frames are divided into rectangular blocks and an optimal shift for each block is determined. The optimal shift is defined in case the $L_1$, or $L_2$, or $L_3$, norm (according to relevant parameter choice) of difference between the shifted reference frame and the frame of interest is minimal. Then, the function loA34 indicated as 10562 in FIG. 1, determines an optimal global shift for every reference frame with respect to the frame of interest. It constructs the histogram of displacements calculated in shilA3 marked as 10561, and the global motion is defined according to the most or second-most populated lot of the histogram. Eventually, the functions shiF34, and hvShi, designated respectively as 10563 and 1057, implement shifts of greylevel and RGB components of respective reference frames, according to results calculated by lglobshif25, which is marked as 1056 in FIG. 1. After optional camera compensation dependent on the value of the parameter prep, the program passes either to the pre-processing block by means of the routine lchofrag10, shown as 1057, or directly to the fine separation block, by means of the routine lsear6, designated as 111.

In case trfod=5, the function Reg performs the multi-resolution analysis in order to find an optimal shift for the reference frames. The frame of interest and two reference frames are filtered by the function Butter_Filt and reduced half a dimension three times. Thus, four levels of the same frames are accepted. Starting from the highest level (the smallest frames), the function Per_Ext performs the periodic extension of every three frames and then by means of the function Shift_Corr two reference frames are divided into rectangular blocks and an optimal shift is determined for each block, exactly as in the procedure shilA3 designated as 10561. Then, the function Glob_Shift determines an optimal global shift for every reference frame with respect to the frame of interest. It constructs the three-dimensional histogram of displacements calculated in Shift_Corr and the global motion is defined according to the most populated lot of the histogram. The function Shift_Ext implements the computed global shift of reference frames on the next (lower) level, if such a level exists, performs its periodic extension and the same algorithm is operated on the lower level.

After providing optional camera movement compensation, depending on the value of the parameter prep, control passes either to the coarse separation block by means of the routine lchofrag10, 107, or to the fine separation block, by means of the routine lsear6, 111 in FIG. 1.

Figure 3:
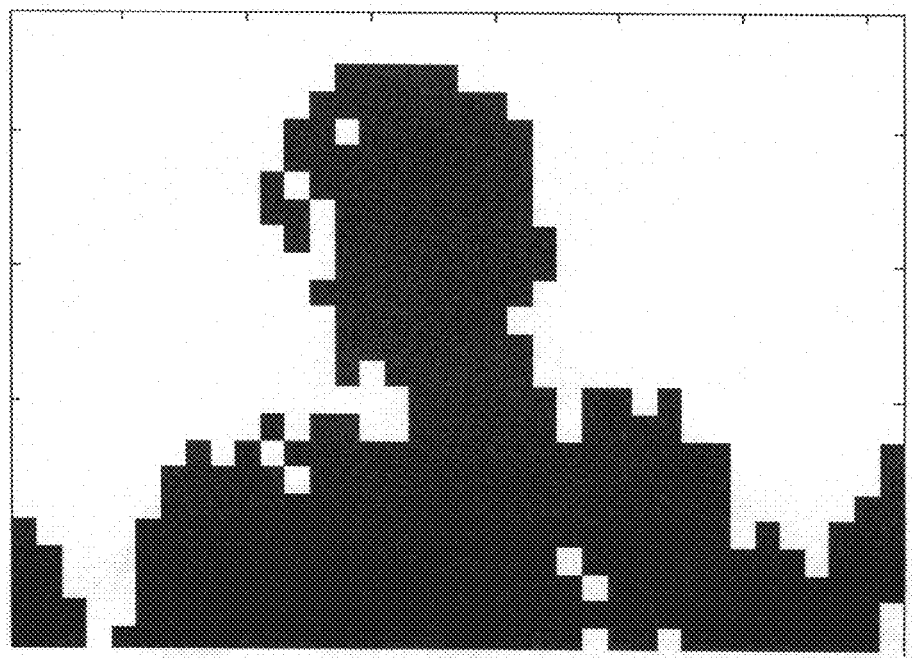
FIG. 3 illustrates the thresholded formula qq.

Inside the frames, the coarse separation block carries out a preliminary separation of moving objects from the still background. It is initiated by the procedure lchofrag10, marked 107. By means of the function filfa, shown as 1058, the coarse separation performs the median filtering of the frame of interest and of two reference frames, then splits motion compensated filtered frames into small sprv×sprh rectangular blocks, and by means of the function shilA3 finds an optimal shift for each block. This information is stored in two-dimensional arrays Rv1, Rv2, Rv3 of size (M/4 ·sprv)×(N/4 ·sprh)×3, where Rv1(:,:,1),~Rv2(:,:,1),~Rv3(:,:,1) denote the displacements between a frames of interest and a preceding reference frame, between two reference frames and between the frame of interest and a subsequent reference frame respectively. Then the function lsegm98 shown as 1058 is recalled. By calculating the array qq according the formula $$qq=|(Rv1(:,:,1)+Rv3(:,:,1))*Rv2(:,:,1)^2|,$$

and its following thresholding by qq's average multiplied by an optional constant, the above function qq determines the blocks of the frame of interest that differ significantly from the corresponding blocks of the reference frames. The thresholded area qq is shown in FIG. 3.

Thus the preliminary (coarse) segmentation performing the separation of the motion area with moving objects from the still background is achieved.

Figure 4:
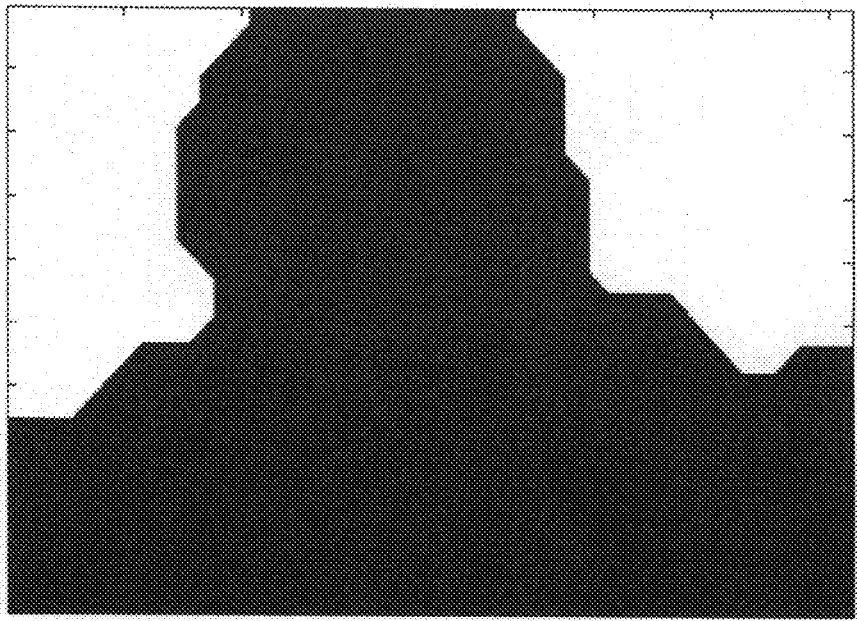
FIG. 4 depicts the thresholded formula qq after dilation and erosion operations.

Eventually, the following successive dilation and erosion operations fill the optional holes in the segmentation, which detects moving object in a frame. The thresholded area qq is shown in FIG. 4 after the dilation and erosion operations.

Figure 5:
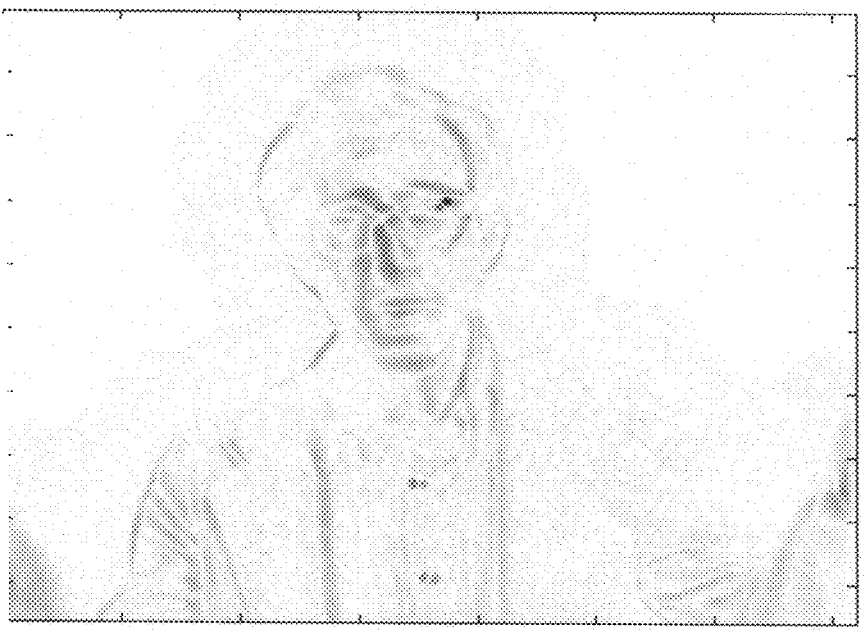
FIG. 5 shows a frame before refined separation.
Figure 6:
FIG. 6 shows a frame after refined separation.

The fine separation block carries out the refined separation of moving objects from the still background and finds fragments of smooth texture inside moving objects that can be treated similarly to the still background. It is initiated by the procedure lsear6, marked 111, which produces the three absolute differences between three filtered frames: a frame of interest and reference frames. The difference between a pair of filtered frames is shown in FIGS. 5 and 6. FIGS. 5 and 6 show an image of a frame respectively before and after refined separation.

Thereafter, the subroutine lshrinC8, shown as 113 is called, to implement a refined separation of the smooth texture background and moving fragments inside the area marked as the moving area in the coarse separation block. This is achieved by means of a wandering testing circle and subsequent morphological operations. Actually, it calls for function lshrinn8, designated as 1131, for preliminary testing of the area in order to adjust the threshold for the testing circle. The output of the function lshrinn8 is a mean value of the coarse segmentation of the background on the left, right, upper and lower borders of a frame of interest. The function lshrinn6, marked 1132, takes the mean value mam from those that were found in the routine lshrinn8, shown as 1131. Denoting by Mcd a maximum value in the circle testing area, and checking whether $$Mcd < up \cdot mam,$$

the area covered by the testing circle is referred to either background or smooth texture and is subject to optional restoration. The following morphological operations performed by the MATLAB functions imopen and bwareopen remove the thin "lines" and small "islands".

The program passes now to the 'defects detection and recovery block' by calling the subroutine lchu6, designated as 114. This procedure prepares a function to be used for the detection of defects inside the smooth texture and background area. At first, the absolute differences between the three frames are calculated:

$$Q12 = |A(:,:,1) - A(:,:,2)|,$$

$$Q32 = |A(:,:,2) - A(:,:,3)|,$$

$$Q13 = |A(:,:,3) - A(:,:,1)|,$$

where $A(:,:,2)$ is the frame of interest, $A(:,:,1)$ is its preceding reference frame and $A(:,:,3)$ is its subsequent reference frame. Then, taking into account that fb is the mask frame for background and smooth texture, the frame QQ123 is defined in the following way:

$$QQ123 = |(Q32 + Q12) - Q13| \cdot fb.$$

Eventually, the parameter $$mu13 = \min(Q12, Q32)/(\max(Q12, Q32) + \epsilon)$$

is calculated and is used later in the procedure lutreCol, shown as 115, which detects defects inside the smooth texture and background area of the frame of interest and fixes the defects using values of reference frames. The mask frame tx for future restoration is constructed in the following way: at first, $$tx = QQ123 \cdot (mu13^{fc}),$$

where fc=2.7 is the false alarm. Then let me be the $L_1$-norm of tx. The future threshold tre1 for tx is constructed by multiplying the me by parameter tre:

$$tre1 = tre \cdot me.$$

Eventually, the mask frame for defects' restoration and correction is accepted by thresholding made to tx on the threshold tre1 using the routine hatre, marked as 1151, and the threshold value tre1. Taking the average value of the relevant components of reference frames performs the restoration for RGB components in frames of interest. The function autoiman indicated as 1152, displays a frame. Finally, the restored frame is saved (if desired), by calling the routine lwrim4, markes as 1151.

Figure 7:
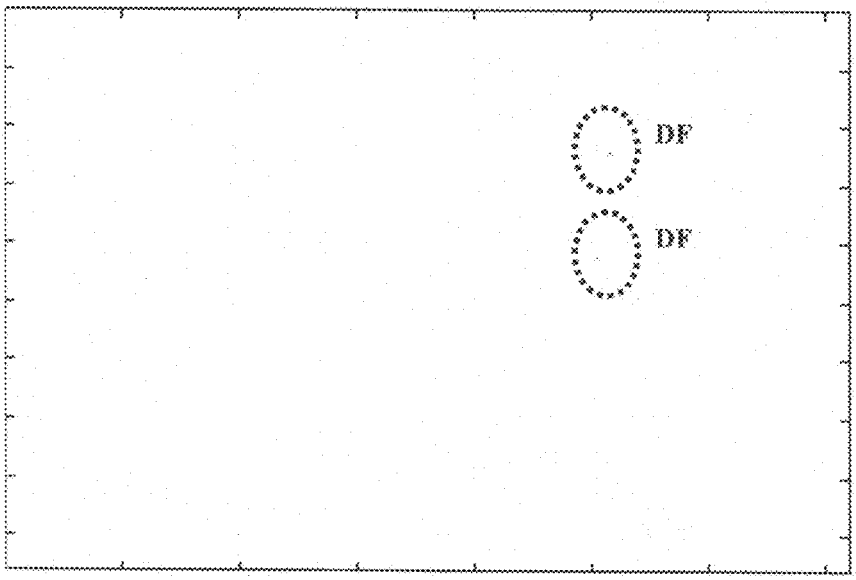
FIG. 7 illustrates a mask frame for defects correction and restoration.
Figure 8:
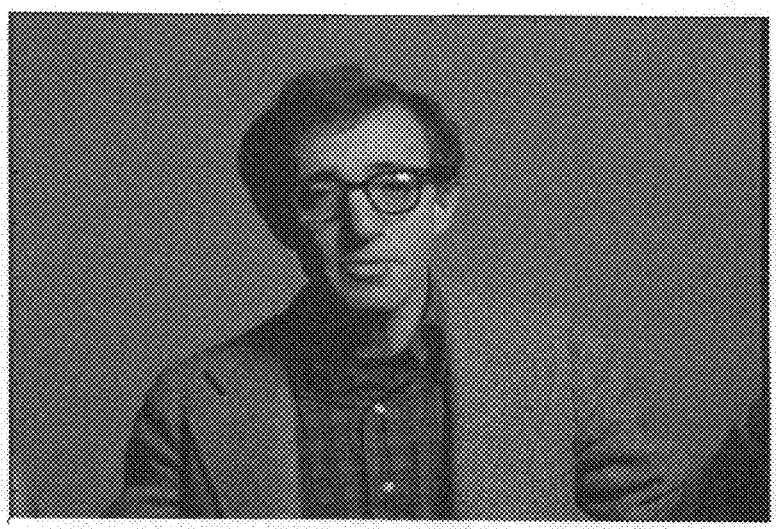
FIG. 8 presents a frame corrected and restored by the mask frame.

FIG. 7 shows a mask frame for defects restoration where the two small defects are surrounded and marked as DF, and FIG. 8 presents the restored frame.

High Definition frames are now treated.

More particularly, processing blocks of High Definition (HD) frames is also feasible by help of appropriate computer programs.

A block is a sequence of consecutive frames, such as in a movie film.

Damaged frames, such as video frames for example, are restored by help of the automatic digital film and video restoration, or the computer programs for automatic restoration of frames, CPAR, which are built as blocks of computer programs operating generally sequentially and in interaction with smaller computer program sections.

It is taken for granted that frame processing is executed on digital data. Should the frame(s) to be restored not be presented in digital form, then digitization thereof is preformed as a prerequisite, by means well known to the art.

Figure 9:
FIG. 9 illustrates a block consisting of four consecutive frames.
Figure 10:
FIG. 10 depicts examples of defects.

High Definition frames, in a block feature frames having high resolution, wide areas of smooth texture, and a large discrepancy between adjacent frames, caused for example, by a moving shadow in the foreground of the frames. Furthermore, the defects in the frames are relatively short and narrow vertical scratches of low intensity. FIG. 9 illustrates a block consisting of four consecutive color frames, from 762 to 765, printed in black and white. As stated, there is a big discrepancy between adjacent frames produced by the moving shadow in the foreground, and the defects are relatively short and narrow vertical scratches of low intensity. Examples of defects are also indicated encircled on another color frame, 824, printed in black and white, which is shown in FIG. 10. The encircled defects, indicated as DF, are clearly seen on the color frame but are less visible when printed in black and white by a laser printer, as is FIG. 10.

For these reasons processing by help of the modified package LUNB, which is based on the comparison of adjacent frames is not suitable for the hereinabove-above mentioned method. In the present case, each frame must be processed separately. Because of the vertical orientation of the scratches these are removed by median filtering of the frames in the horizontal direction. Median filtering successfully removes vertical scratches, and does not affect smooth texture but can smooth edges in the frame and remove thin lines. To avoid these undesirable effects, smooth texture areas are separated from regions containing edges via calculation of the coherency map of the frame. Median filtering is carried out only within the smooth texture areas. In rare cases, when a defect lies near or on an edge, the filtering area is expanded. To avoid smoothing the edge, a restoration and correction procedure is applied as described hereinbelow with respect to the morphologic operations. Data processing blocks of high definition frames Processing is implemented by execution of the routine ltri82, having amongst others, the following variable parameters:

wi—width of the median filter, range 10-25. Increase of wi enables to eliminate wider defects but enhances the smoothing effect on edges and vice versa.

tre—threshold, which performs the separation of smooth texture areas and regions containing edges by use of the coherency map. Range: 0.15-0.35. The larger the value of tre, the wider the area labeled as the texture and consequently, subjected to median filtering.

luli—half-length of the base for the calculation of the coherency. In the current setting luli=1.

The following steps are an example of the procedure used for the removal of defects from a block of frames.

First, the color components of the frame, red, green, and blue are loaded by use of a function dfran1, suited for that purpose.

The coherency map is calculated for at least one color component, say for the blue component Bb by help of the function lazim2(Bb; luli; tre). Given a point M0(x0; y0) of the frame, a square Q0 is selected, having a center at M0 and with sides parallel to the x and y axes. The length of the side is 2*luli. Four lines are drawn through the center of the square. Two of the lines are the diagonals of the square and the other two are parallel to respectively, the x and y axes. The lines correspond to the angles $\theta_0=0°$, $\theta_1=45°$, $\theta_2=90°$ and $\theta_3=135°$. Then the coefficients of coherency are found along each of these four directions. For this purpose the data $F_{0;k}=f(x_0+k, y_0)$, $F_{1;k}=f(x_0+k; y_0+k)$, $F_{2;k}=f(x_0; y_0+k)$, $F_{3;k}=f(x_0+k; y_0-k)$; k=−luli; . . . ; luli, are collected from the pixels along these directions. Here $f(x; y)$ is the intensity of the pixel in the point M(x; y). Then the coefficients of coherency are calculated for each direction:

$$P(M_0, \theta_j) = \frac{\left(\sum_{k=-luli}^{luli} F_{j,k}\right)^2}{(2luli+1)\sum_{k=-luli}^{luli} F_{j,k}^2},$$

$$j = 0,1,2,3.$$

The conceptual idea behind the method for the determination of the direction of coherency is based on the fact that in an ideal case, provided the pixels have constant values along some line, the coefficient of coherency along that line is equal to one. In real conditions, it may be less than one, but nevertheless, it is maximal among coefficients calculated along all other directions.

Figure 11:
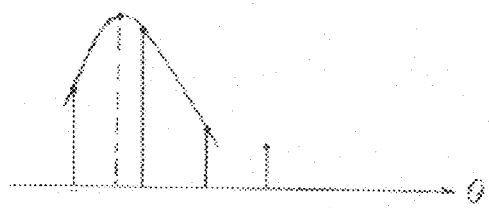
FIG. 11 shows how the coefficient of coherency is derived.

To find this maximal direction the maximal value $p_{ma}=P(M_0; \theta_{ma})$ of the four coefficients $P(M_0; \theta_j)$ is selected and the values $p_{ma-1}=P(M_0; \theta_{ma-1})$ and $p_{ma+1}=P(M_0; \theta_{ma+1})$ of the coefficient for two neighboring values of the angle $\theta$. The minimal value of the four coefficients is denoted by $p_{mi}=P(M_0; \theta_{mi})$. Then a parabola $p=f(\theta)$ is drawn through the three points $(\theta_{m+1}; p_{m+1})$, $(\theta_m; p_m)$, and $(\theta_{m-1}; p_{m-1})$. The parabola achieves its maximum $p_{max}$ at some value $\theta_{max}(M_0)$. This angle $\theta_{max}$ determines the direction of the coherency at the point $M_0$. The coefficient of coherency at this point is pmax $(M_0)$, as illustrated in FIG. 11.

It is noted that the values of the coefficients of coherency along all four directions at the points of the frame belonging to smooth texture areas are very close to each other. To single these points out, the maximal coefficient of coherency $p_{ma}$ is compared with the minimal coefficient $p_{mi}$ at a given point $M_0$. Denote mami=$p_{ma}-p_{mi}$ and let mei be the mean value of the variable mami on the whole image. Finally, all the points M⁻ in the frame where mami<tre mei are found. The coefficient and angle of coherency are not calculated at these points but rather put $p_{max}(M^-)=0$ and max(M⁻)=0. The set of all such points M⁻ are denoted by μ⁻. The sequence of operations describe hereinabove is carried out for all points M(x; y) in the rest of the frame. The set of these points M is denoted by μ. The results are collected in two maps, having a size equal to the size of the frame:

$$MAn(M(x, y)) = \begin{cases} 0, & \text{if } M(x, j) \in \tilde{\mu}; \\ \theta_{max}(M)+1, & \text{if } M(x, y) \in \mu, \end{cases}$$

$$MAb(M)(x, y) = \begin{cases} 0, & \text{if } M(x, y) \in \tilde{\mu}; \\ p_{max}(M)+1, & \text{if } M(x, y) \in \mu. \end{cases}$$

The angles θ are quantized to 36 integer values: 1, 2, . . . , 36. These two maps are combined into the array Maz:

Maz(M(x;y);1)=MAn(M(x;y);Maz(M(x;y);2)= MAb(M(x;y).

Figure 12:
FIG. 12 shows four frames 12a, 12b, 12c, and 12d.

We display The coherency map MAn is displayed for the Blue component of the frame shown in FIG. 10 as the first picture from the left in FIG. 12, namely 12a.

In FIG. 12, 12a shows a coherency map for the Blue component of the frame shown in FIG. 10; 12b depicts the separation of smooth texture areas and regions containing edges; 12c illustrates the difference aq between the original Blue component of the frame shown in FIG. 10 and the filtered version; and 12d is a map for the restoration of smoothed edges.

Third, smooth texture areas are separated from regions containing edges.

As it is seen from the image of the map MAn, most of the values are zero in the smooth texture areas. The area is cleaned by the morphological operations se=strel('line',10,0);

x=imopen(MAn,se);

x=bwareaopen(x,550);

that remove small non-zero patches and apply the procedure se=strel('line',15,90);

x=imclose(x,se);

which fills the gaps in the remaining non-zero regions. The binary image x is displayed at 12b, in FIG. 12. The zero region X indicates the smooth texture areas. The non-zero-region are denoted by XX.

Fourth, median filtering is performed to remove the defects from the frame. Median filtering of the Red, Green, and Blue components of the frame is performed by the MATLAB function medfilt1. Then original values are restored to the pixels located at the non-zero-regions XX. Thus, only texture areas X remain filtered. Filtering removes vertical scratches from the texture areas.

Fifth, smoothed edges are restored.

The difference aq between the original Blue component of the frame No. 824 shown in FIG. 10, and the filtered version is displayed in 12c of FIG. 12. It is seen that the difference are present only in the area X. The restored scratches are clearly seen, but some edges became smoothed. This happens when the filtered area X is extended (by decreasing the parameter tre) in order to catch the scratches located near edges. To correct this drawback, the vast connected blocks that correspond to the smoothed edges are singled out in the difference map by use of the morphological operations:

$$mam = \max(aq(:));$$

$$qa = (aq > mam/10);$$

$$qaq = bwareaopen(qa, Q);$$

Figure 13:
FIG. 13 presents the frame of FIG. 10 after restoration with all defects removed.

The map qaq of remaining blocks is displayed in 12*d* of FIG. 12. Then, the original values are restored to the pixels of the Red, Green, and Blue components located in the nonzero-regions of the map qaq. Finally, the frame is reconstructed from the restored Red, Green, and Blue components. The now restored frame shown in FIG. 10 is displayed as a black and white laser printed FIG. 13 with all defects removed.

Finally, the frame is reconstructed from the restored red, green, and blue components, and a defect-free frame is obtained. The restoration is clearly shown on the color frames but is less clear in black and white printing.

Figure 14:
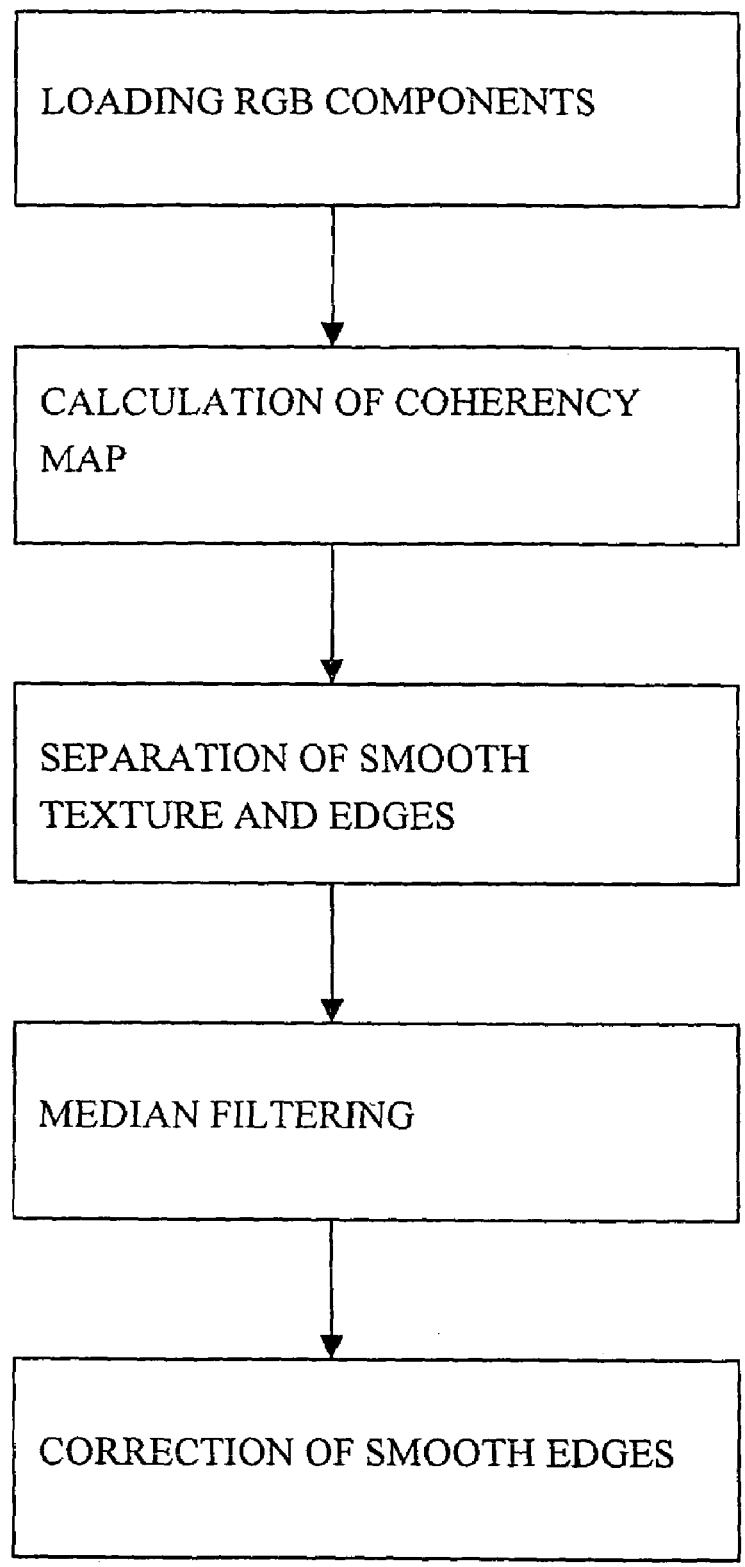
FIG. 14 is a flowchart of the frame restoration process.

FIG. 14 is a flowchart of the five mains steps described hereinabove.

Figure 15:
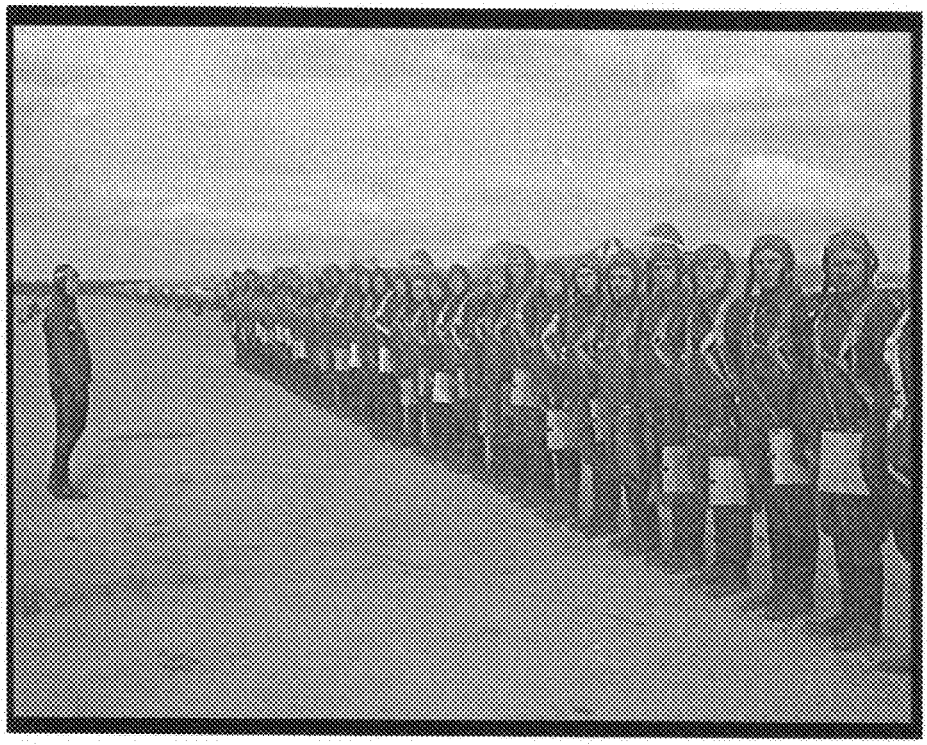
FIG. 15 is a frame before restoration.
Figure 16:
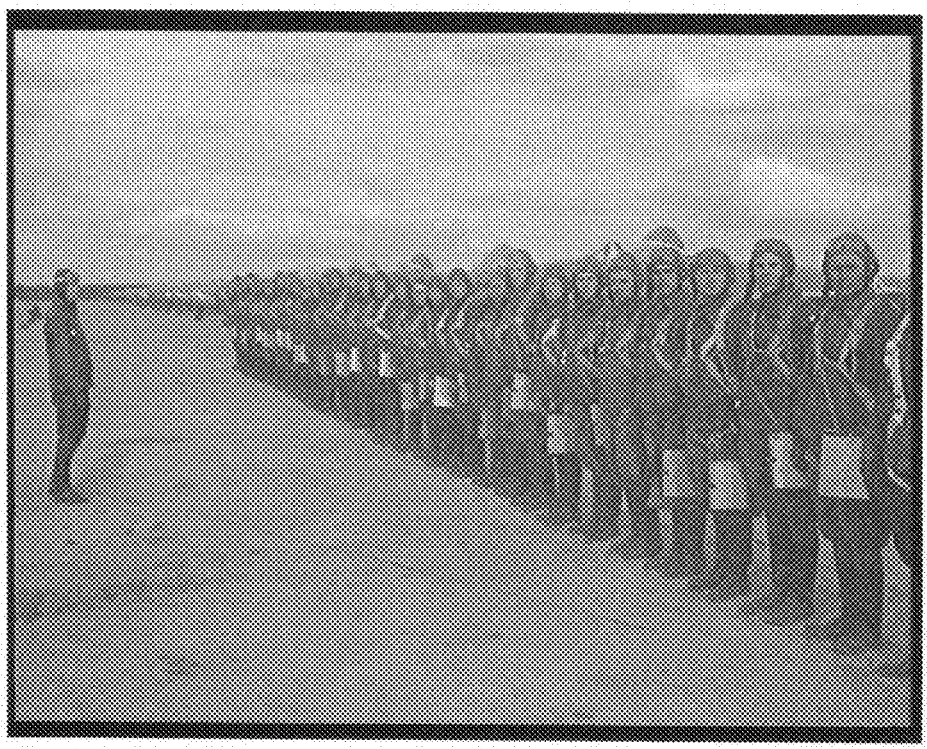
FIG. 16 shows the frame of FIG. 15 after restoration.

FIG. 15 is a color frame with large defects, printed in black and white. The same color frame is shown after restoration as FIG. 16. Even though printed on a laser printer in black and white, the large and easily discernable scratches appearing in FIG. 15 are invisible after restoration, as illustrated in FIG. 16.

It will be appreciated by persons skilled in the art, that the present invention is not limited to what has been particularly shown and described hereinabove. If desired, the computer program and the method are operated in combination of other suitable computer programs and methods, such as for example, those based on the geometric description of 3D data sets and reduction of dimensions. For this purpose, data filtering into frequency bands using kernel operators is employed. Further, wavelet decompositions using wide families of Splines' wavelets and bi-orthogonal wavelets are taken advantage from, followed by adapted thresholding, and non-linear approximation by different families of wavelets.

Rather, the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A method applicable to digital film and video movies for automatic restoration of defects on at least one frame of a succession of f digital frames where f is a positive integer greater than zero, the method being operated by entering the succession of frames as input into a computer, and operating a software computer program to produce an output, the method comprising the steps of:
   selecting at least one color component from the group consisting of red, green, and blue, and loading the at least one color component as input from the succession of frames to obtain a restored output,
   calculating a coherency map for each frame of the succession of frames,
   separating areas of each frame having a smooth texture from regions containing edges via calculation of the coherency map,
   removing defects appearing on a frame by application of median filtering on texture area(s) defined by the coherency map,
   correcting each frame of the succession of frames for restoration of smoothed edges pertaining to connected blocks corresponding to the smoothed edges singled out from a difference map by use of the coherency map, and
   reconstructing each frame of the succession of frames from the at least one restored color component and remaining color components out of the group of three components, whereby all defects are removed and a succession of f frames free of defects is obtained.

2. The method according to claim 1, wherein:
a coherency map of a frame is calculated for carrying out median filtering only within smooth texture areas and applying a correction and restoration procedure to avoid smoothing edges.

3. The method according to claim 1, wherein:
a coherency map is calculated for at least one color component by finding coefficients of coherency along four directions and calculating coefficients of coherency for each one of the four directions:

$$P(M_0, \theta_j) = \frac{\left(\sum_{k=-luli}^{luli} F_{j,k}\right)^2}{(2luli+1)\sum_{k=-luli}^{luli} F_{j,k}^2},$$

$$j = 0,1,2,3.$$

4. The method according to claim 3, wherein:
results of calculations of the coefficient and angle of coherency are collected in two maps having a size equal to the size of a frame:

$$MAn(M(x, y)) = \begin{cases} 0, & \text{if } M(x, j) \in \tilde{\mu}; \\ \theta_{\max}(M) + 1, & \text{if } M(x, y) \in \mu, \end{cases}$$

$$MAb(M)(x, y) = \begin{cases} 0, & \text{if } M(x, y) \in \tilde{\mu}; \\ p_{\max}(M) + 1, & \text{if } M(x, y) \in \mu. \end{cases}$$

5. The method according to claim 1, wherein:
smooth texture areas are separated from regions containing edges by use of a set of morphological operations on the coherency map MAn:
se=strel('line',10,O);
x=imopen(MAn,se);
x=bwareaopen(x,550);
to remove small non-zero patches and apply a procedure
se=strel('line',15,90);
x=imclose(x,se);
to fill gaps in remaining non-zero regions.

6. The method according to claim 1, wherein:
median filtering of texture area(s) defined by the coherency map is performed to remove defects from a frame by use of a MATLAB function medfilt1.

7. The method according to claim 1, wherein:
smoothed edges are corrected and restored by a set of morphological operations on the difference aq between the original and the filtered color component of the frame:

$$mam = \max(aq(:));$$

$$qa = (aq > mam/10);$$

$$qaq = bwareaopen(qa, Q);$$

where Q is a parameter, which controls the correction procedure.

8. The method according to claim 1, wherein:
the coherency map is used for camera motion compensation.

9. The method according to claim 2, wherein:
median filtering is performed for removing defects from high definition frames.

10. A computer readable medium storing instructions that, when executed by a computer cause the computer to perform each of the method steps of claim 1.

11. A computer readable medium storing a computer program applicable to digital film and video movies, for automatically restoring defects on at least one frame of a succession of f frames, where f is a positive integer greater than zero, the computer program, which when executed by a computer having a memory, causing the computer to perform a method comprising:
selecting at least one color component from the group consisting of red, green, and blue being derived from the at least one frame and loading the at least one color component as input into the computer to obtain a restored output,
calculating a coherency map for the at least one frame for executing calculation on the at least one derived color,
separating areas of the at least one frame having a smooth texture and regions of the at least one frame containing edges from each other via calculation of the coherency map,
applying median filtering on texture area(s) defined by the coherency map to the at least one frame for removing defects therefrom,
correcting and restoring smoothed edges on the at least one frame pertaining to connected blocks corresponding to the smoothed edges singled out from a difference map by use of the coherency map, and
reconstructing the at least one frame from the at least one corrected color component and remaining color components of the group of three components,
whereby all defects are removed and an at least one frame free of defects is obtained.

12. The computer program, according to claim 11, wherein:
at least one color component selected from the group consisting of red, green, and blue, is loaded as input from the succession of frames to obtain a restored output,
a coherency map is calculated for each frame of the succession of frames,
areas of each frame having a smooth texture are separated from regions containing edges via calculation of the coherency map,
defects appearing on a frame are removed by application of median filtering on texture area(s) defined by the coherency map,
each frame is corrected for restoration of smoothed edges pertaining to connected blocks corresponding to the smoothed edges singled out from a difference map by use of the coherency map, and
each frame is reconstructed from the at least one restored color component and remaining color components out of the group of three components,
whereby all defects are removed and a succession of f frames free of defects is obtained.

13. The computer program, according to claim 11, wherein:
a coherency map of a frame is calculated for carrying out median filtering only within smooth texture areas and applying a correction and restoration procedure to avoid smoothing edges.

14. The computer program, according to claim 11, wherein:

a coherency map is calculated for at least one color component by finding coefficients of coherency along four directions and calculating coefficients of coherency for each one of the four directions:

$$P(M_0, \theta_j) = \frac{\left(\sum_{k=-luli}^{luli} F_{j,k}\right)^2}{(2luli+1)\sum_{k=-luli}^{luli} F_{j,k}^2}, j = 0, 1, 2, 3.$$

15. The computer program, according to claim 14, wherein:
results of calculations of the coefficient and angle of coherency are collected in two maps having a size equal to the size of a frame:

$$MAn(M(x,y)) = \begin{cases} 0, & \text{if } M(x,y) \in \bar{\mu}; \\ \theta_{max}(M)+1, & \text{if } M(x,y) \in \mu, \end{cases}$$

$$MAb(M(x,y)) = \begin{cases} 0, & \text{if } M(x,y) \in \bar{\mu}; \\ P_{max}(M)+1, & \text{if } M(x,y) \in \mu. \end{cases}$$

16. The computer program, according to claim 11, wherein:
smooth texture areas are separated from regions containing edges by use of a set of morphological operations on the coherency map MAn:
se=strel('line',10,O);
x=imopen(MAn,se);
x=bwareaopen(x,550);
to remove small non-zero patches and apply a procedure
se=strel('line',15,90);
x=imclose(x,se);
to fill gaps in remaining non-zero regions.

17. The computer program, according to claim 11, wherein:
median filtering of texture area(s) defined by the coherency map is performed to remove defects from a frame by use of a MATLAB function medfilt1.

18. The computer program, according to claim 11, wherein:
smoothed edges are corrected and restored by a set of morphological operations:

$$mam = \max(aq(:));$$
$$qa = (aq > mam/10);$$
$$qaq = bwareaopen(qa, Q);$$

where Q is a parameter which controls the correction procedure.

19. The computer program, according to claim 11, wherein:
the coherency map is used for camera motion compensation.

20. The computer program, according to claim 11, wherein:
median filtering is performed for removing defects from high definition frames.

* * * * *